United States Patent [19]

Ben-Michael et al.

[11] Patent Number: 5,602,853
[45] Date of Patent: Feb. 11, 1997

[54] METHOD AND APPARATUS FOR SEGMENTATION AND REASSEMBLY OF ATM PACKETS USING ONLY DYNAMIC RAM AS LOCAL MEMORY FOR THE REASSEMBLY PROCESS

[75] Inventors: Siman-Tov Ben-Michael, Givat Zeev; Michael Ben-Nun, Jerusalem, both of Israel

[73] Assignee: Digital Equipment Corporation, Maynard, Mass.

[21] Appl. No.: 333,914

[22] Filed: Nov. 3, 1994

[51] Int. Cl.[6] ............................................. H04J 3/24
[52] U.S. Cl. ........................... 370/474; 370/39.5; 370/471
[58] Field of Search ................................ 370/94.2, 94.1, 370/60, 60.1, 84, 85.1

[56] References Cited

U.S. PATENT DOCUMENTS 5,185,736  2/1993  Tyrrell et al. ............................ 370/84
5,274,768  12/1993 Traw et al. .............................. 395/275
5,420,858  5/1995  Marshall et al. ....................... 370/94.1

Primary Examiner—Douglas W. Olms
Assistant Examiner—Shick Hom
Attorney, Agent, or Firm—Kenneth F. Kozik

[57] ABSTRACT

An Asynchronous Transfer Mode (ATM) network adapter having a receiver portion, the receiver portion capable of receiving a first plurality of ATM cells and assembling the first plurality of ATM cells into a first plurality of packets, and a transmitter portion, the transmitter receiving a second plurality of packets and segmenting the second plurality of packets into a second plurality of ATM cells, the receiving portion having a local memory for segmentation, while the transmitter portion having no local memory.

4 Claims, 4 Drawing Sheets

METHOD AND APPARATUS FOR SEGMENTATION AND REASSEMBLY OF ATM PACKETS USING ONLY DYNAMIC RAM AS LOCAL MEMORY FOR THE REASSEMBLY PROCESS

FILED OF THE INVENTION

This invention relates generally to the field of computer networks, and more particularly to a method and apparatus for segmentation and reassembly of Asynchronous Transfer Mode (ATM) packets using only dynamic random access memory (DRAM) as local memory for the reassembly of packets.

BACKGROUND OF THE INVENTION

In general terms, a computer network is a collection of end systems (also known as nodes) interconnected through one or more communication links. Generally, the end systems both send data to other end systems on the network and receive data sent by other end systems on the network. When an end system is a sender of data, it is referred to as a source for that data; when it is a receiver of data, it is referred to as a destination for the data. Typically, end systems act as both sources and destinations depending on whether they are sending or receiving data. When acting as a source, the system typically sends data in the form of messages over a communication link. Messages can flow back and forth to other communication links and end systems within the network through bridges or routers, which are used to interconnect multiple communication links.

Each message comprises a sequence of bits. Typically, messages sent over a network are divided up into smaller blocks of information called packets. The flow of packets in the network is usually referred to as traffic. An important design objective in networks is controlling traffic so that individual packets will not be transmitted at a faster rate than they can be processed by the communication links, or intermediate systems such as bridges or routers, through which the packets will pass, or by the destinations.

Asynchronous Transfer Mode (ATM) is one of the general class of digital switching technologies that relay and route traffic by means of a virtual circuit identifier (VCI) contained within the cell. Unlike common packet technologies, such as X.25 or frame relay, ATM uses very short, fixed length units of information, called cells. In applications utilizing ATM, packets at a source are first broken up into these fixed length packets (ATM cells), transmitted, and then reassembled at a destination. ATM cells are 53 bytes long. They consist of a 5-byte header (containing an identifier of data flow which implicitly identifies the source address and the destination address) and a 48-byte information field. The header of an ATM cell contains all the information the network needs to relay the cell from one node to the next over a pre-established route. User data is contained in the remaining 48 bytes.

ATM uses a concept of virtual networking (or channels) to pass traffic between two locations, establishing virtual connections between a pair of ATM end-systems which are needed to connect a source with a destination. These connections are termed "virtual" to distinguish them from dedicated circuits. ATM cells always traverse the same path from source to destination. However, ATM does not have to reserve the path for one user exclusively. Any time a given user is not occupying a link, another user is free to use it.

ATM connections exist only as sets of routing tables held in each network node, switch, or other intermediate system, based on the virtual circuit identifier (VCI) and virtual path identifier (VPI) contained in the cell header. When a virtual path is established, each node (or switch) is provided with a set of lookup tables that identify an incoming cell by header address, route it through the node to the proper output port, and overwrite the incoming VCI/VPI with a new one that the next node along the route will recognize as an entry in its routing table.

The cell is thus passed from switch to switch over a prescribed route, but the route is "virtual" since the facility carrying the cell is dedicated to it only while the cell traverses it. Two cells that are ultimately headed for different destinations may be carried, one after the other, over the same physical wire for a common portion of their journey.

With current implementations of ATM, adapters use local memory in a variety of ways. A first implementation uses two local memories in the ATM adapter. One ATM adapter local memory is used for ATM cell reassembly, while another ATM adapter local memory is used to segment packets in ATM cells. With such an arrangement, an extra ATM adapter local memory is necessary for segmentation.

In another current ATM implementation, one local memory in an ATM adapter is used for both ATM cell reassembly and packet segmentation. In such an implementation, the operations of segmentation and reassembly are done concurrently in the one local memory. The available bandwidth from the local memory is the maximum number of bytes (or bits) one can read or write from or to at a unit of time. This bandwidth is a function of the local memory speed and its data width. With such an arrangement, as an example, in order to support a serial line input/output rate of 155.52 Mbps, a bandwidth of 155.52 times 4 is needed. The 4 Mbps comes from the fact that when a packet is reassembled it is written first, cell after cell, then read at 155.52 times 2 when reassembly is complete. In addition, when a packet is segmented it is first written into the local memory and then read, cell by cell, each time for transmission on the serial line (i.e., 155.52 Mbps times 2). Thus, the bandwidth requirements from the local memory is bigger when the local memory is used for both segmentation and reassembly. the segmentation is accomplished by first preforming a direct memory access (DMA) of the whole packet into the ATM adapter local memory and then starting to segment the packet by sending an ATM cell one at a time.

In still another ATM implementation, a local memory of an ATM adapter will only be used to store a number of control variables. In such an implementation, segmentation and reassembly are accomplished in a host memory. With such an implementation, bursts of 48-bytes are not optimal to use the maximum available system bus bandwidth because (1) the longer the DMA transfer bursts are, the higher bandwidth from the system bus is obtained (this is also true for the local memory since DRAM also uses bursts, and the longer the bursts are, the more bandwidth one can get out of the local memory); and (2) "48" is not a binary number; since most cache lines are in length of 2 to the X power, if a write operation finishes in the middle of a CPU cache line, the next burst will result in one additional update because writing in the middle of the CPU cache line causes the CPU to update the CPU cache line again in its main memory.

A method of handling the reassembly process in one ATM adapter local memory is needed where segmentation may be done by utilizing a relatively small buffer on a chip.

SUMMARY OF THE INVENTION

In accordance with the present invention, an Asynchronous Transfer Mode (ATM) network adapter having a receiver portion, the receiver portion capable of receiving a first plurality of ATM cells and assembling the first plurality of ATM cells into a first plurality of packets, and a transmitter portion, the transmitted portion having a means for processing a second plurality of transmit host memory packets and segmenting the second plurality of packets into a second plurality of ATM cells. Furthermore, the receiver portion contains a local memory while the transmitter portion contains no such local memory. With such an arrangement, one local memory is used for the reassembly process while segmentation is accomplished by a relatively small buffer on a chip.

BRIEF DESCRIPTION OF THE DRAWINGS

The novel features believed characteristic of the invention are set forth in the appended claims. The invention itself, however, as well as features and advantages thereof, will be best understood by reference to the detailed description of specific embodiments which follows, when read in conjunction with the accompanying drawings, wherein:

DETAILED DESCRIPTION

Figure 1:
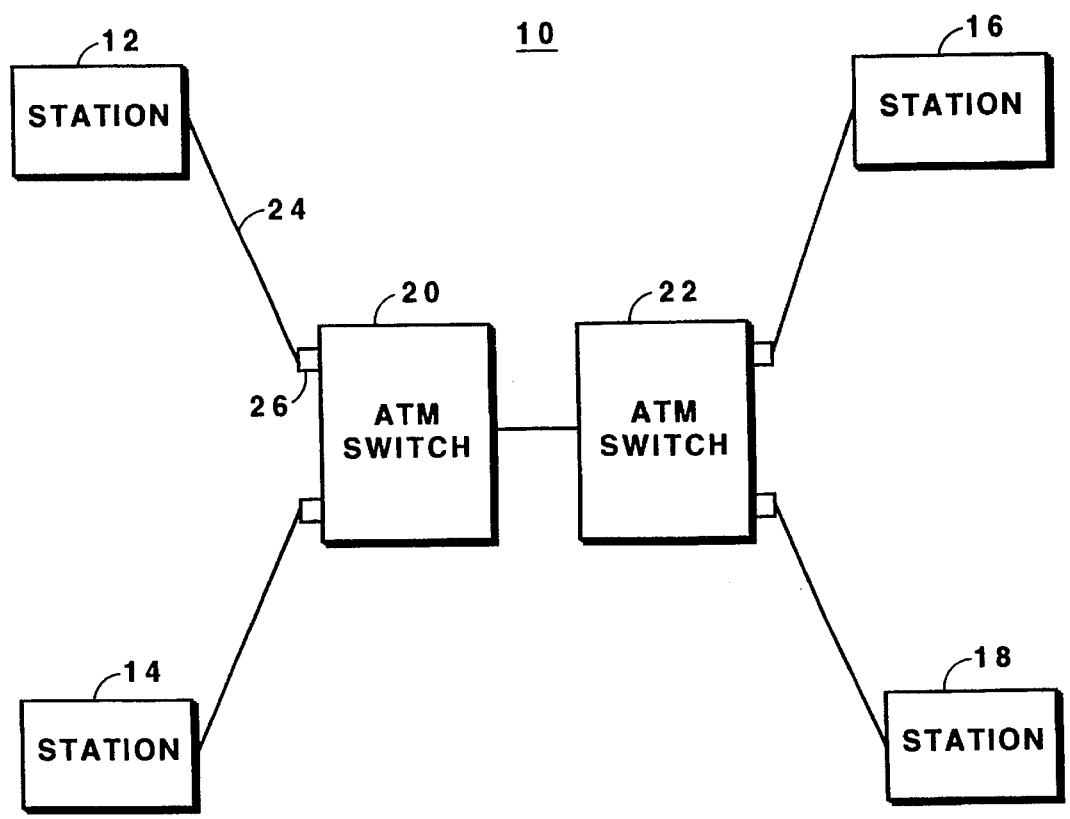
FIG. 1 is a block diagram showing an exemplary Asynchronous Transfer Mode (ATM) local area network (LAN)

Referring to FIG. 1, an exemplary Asynchronous Transfer Mode (ATM) local area network (LAN) 10 is shown to include four stations labeled as 12, 14, 16, and 18, respectively. The ATM network 10 is also shown to include two ATM switches labeled as 20 and 22, respectively. An ATM adapter resides in each of the stations 12, 14, 16, and 18. By way of example, if station 12 is transmitting packets for station 16, the ATM adapter in station 12 is involved in segmenting the packets into cells, and affixing the appropriate fields in a cell header (of FIG. 2 and FIG. 3). The ATM adapter in station 16 is involved in reassembling the cells received into a complete packet and delivering the packet to station 16. Control of the ATM network 10 resides in the ATM switches 20 and 22, which route messages between stations. For example, the station 12 may send a cell over a line 24 to ATM switch 20 through port 26. ATM switch 20 will route the cell to a destination, Station 16, for example, according to a VCI/VPI in an ATM cell header.

Because each port 26 is dedicated to one station 12, other stations (14 for example) do not have to contend for access to the ATM switch 20. Thus, the station 12 has full access to the line 24 regardless of the activity of other stations with other such connections. For example, if a 5 Mb file is being transmitted from station 12 to station 16, it can move to the ATM switch 20 in a continuous burst at the full channel rate, instead of sharing the communication link with the other stations and having intervening frames from other stations as with other LANs, such as Ethernet, Token Ring, and Fiber Distributed Data Interface (FDDI) LANs.

Figure 2:
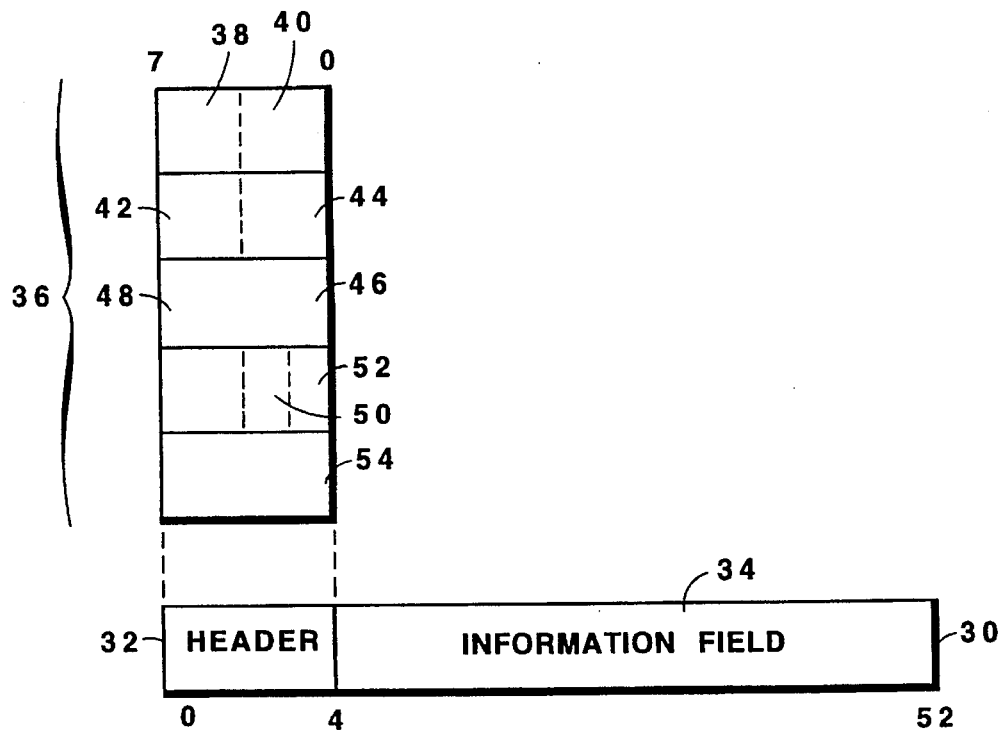
FIG. 2 is a block diagram showing an exemplary ATM cell.

Each message in the ATM network 10 is comprised of one or more fixed length units of data called ATM cells. Referring to FIG. 2, an ATM cell 30 is shown to be 53 bytes long. The ATM cell 30 is typically divided into a 5-byte header 32 and a 48-byte information field 34. The 5-byte header 32 contains several fields 36. Specifically, a first byte contains a generic flow control (GFC) field 38 and part of a virtual path identifier (VPI) field 40. A second byte contains another part of the VPI field 42 and part of a virtual channel identifier (VCI) field 44. A third byte contains another part of the VCI field 46. A fourth byte contains the remaining part of the VCI field 48, a payload type identifier (PTI) field 50, and a cell loss priority field (CLP) 52. A fifth byte contains a header error check 54.

The address of the ATM cell 30 is contained in the fields labeled VPI (40 and 42) and VCI (44, 46, and 48). This two-part identification allows the ATM network 10 (of FIG. 1) to route data contained in the information field 34 between locations while maintaining the identity of individual circuits within a trunk.

Figure 3:
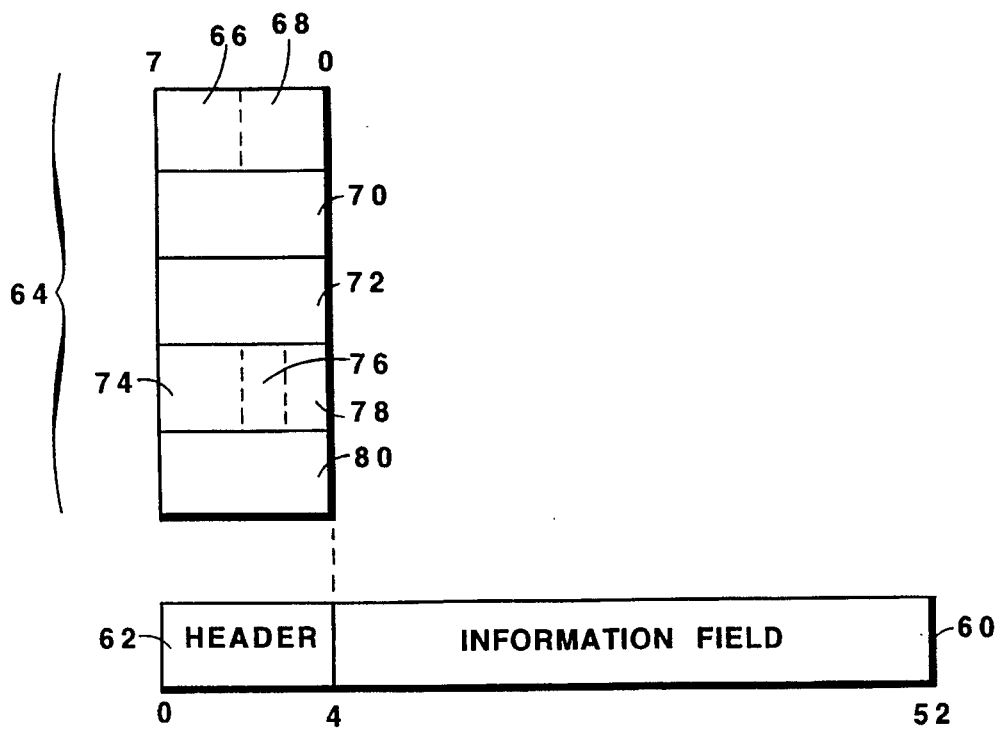
FIG. 3 is a block diagram showing an exemplary ATM cell which includes a credit field.

Referring to FIG. 3, an alternative header 62 of an ATM cell 60 is shown. The header 62 is 5 bytes long and contains several fields 64. Specifically, a first byte contains a GFC field 66 and a part of credit virtual circuit identifier (credit VCI) 68. A second byte contains another part of the credit VCI 70. A third byte contains part of a destination VCI 72. A fourth byte contains a remaining part of the destination VCI 74, a PTI field 76, and a CLP field 78. A fifth byte contains a header error check field 80.

Figure 4:
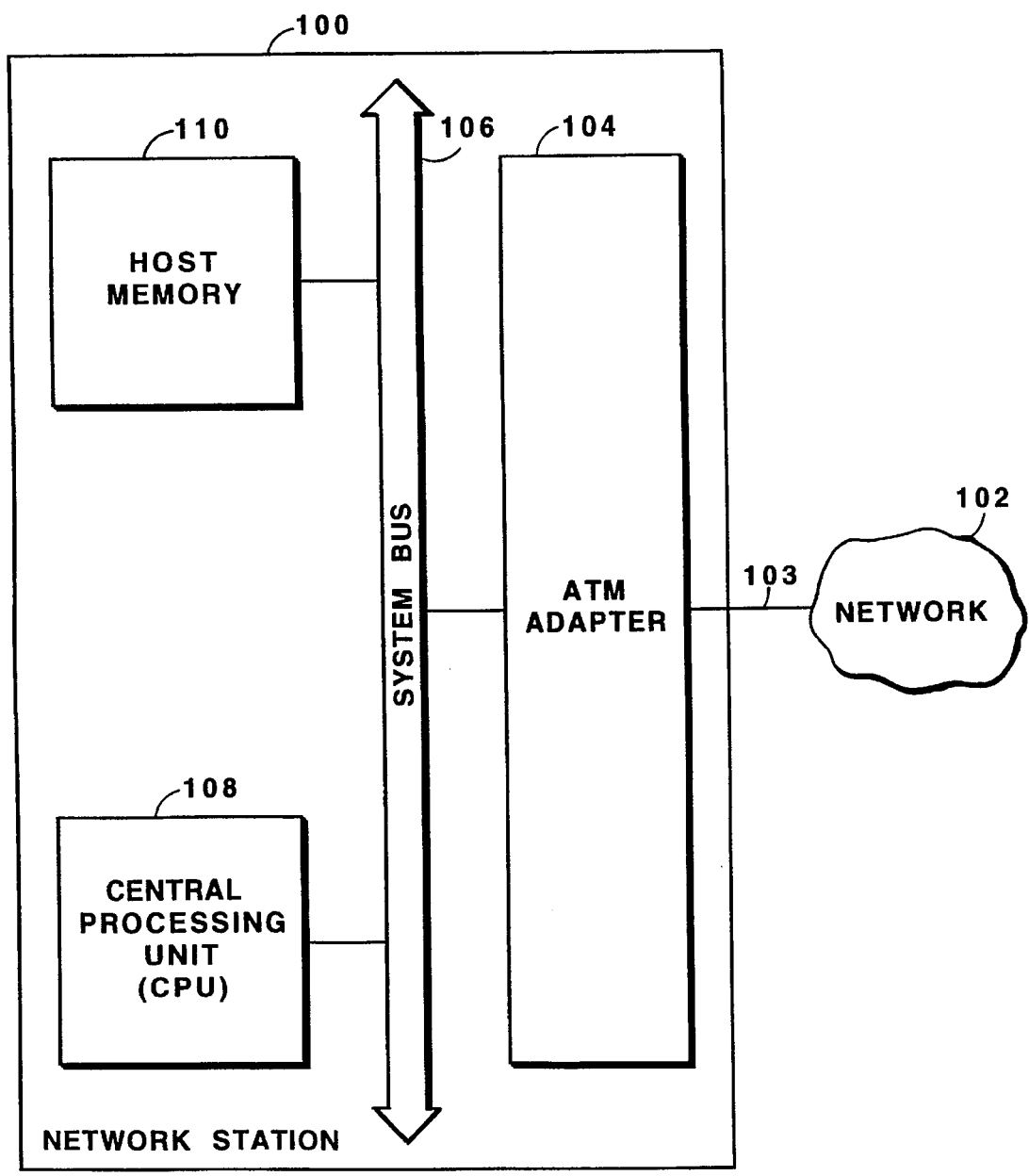
FIG. 4 is a block diagram of an exemplary network station on a computer network, including an exemplary ATM adapter.

Referring to FIG. 4, a diagram of a network station 100 is shown coupled to a network 102 via a communications link 103. The network station 100 shown in FIG. 4 is an exemplary embodiment of any one of network station 12, network station 14, network station 16, or network station 18, as shown in FIG. 1. The network station 100 includes a network adapter 104 coupled to a system bus 106, a central processing unit (CPU) 108 coupled to the system bus 106, and a host memory 110 coupled to the system bus 106. For purposes of example, the network adapter 104 is an ATM network adapter, and the network 102 is an ATM network.

By way of example, ATM cells received by network station 100 via the communications link 103 are reassembled into packets in ATM adapter 104 and sent via the system bus 106 in the host memory 106. On the other hand, packets which are transmitted from the network station 100 are sent from host memory 110 via the system bus 106 to ATM adapter 104. While in ATM adapter 104, packets are segmented into ATM cells and sent out to ATM network 102 via the communications link 103.

Figure 5:
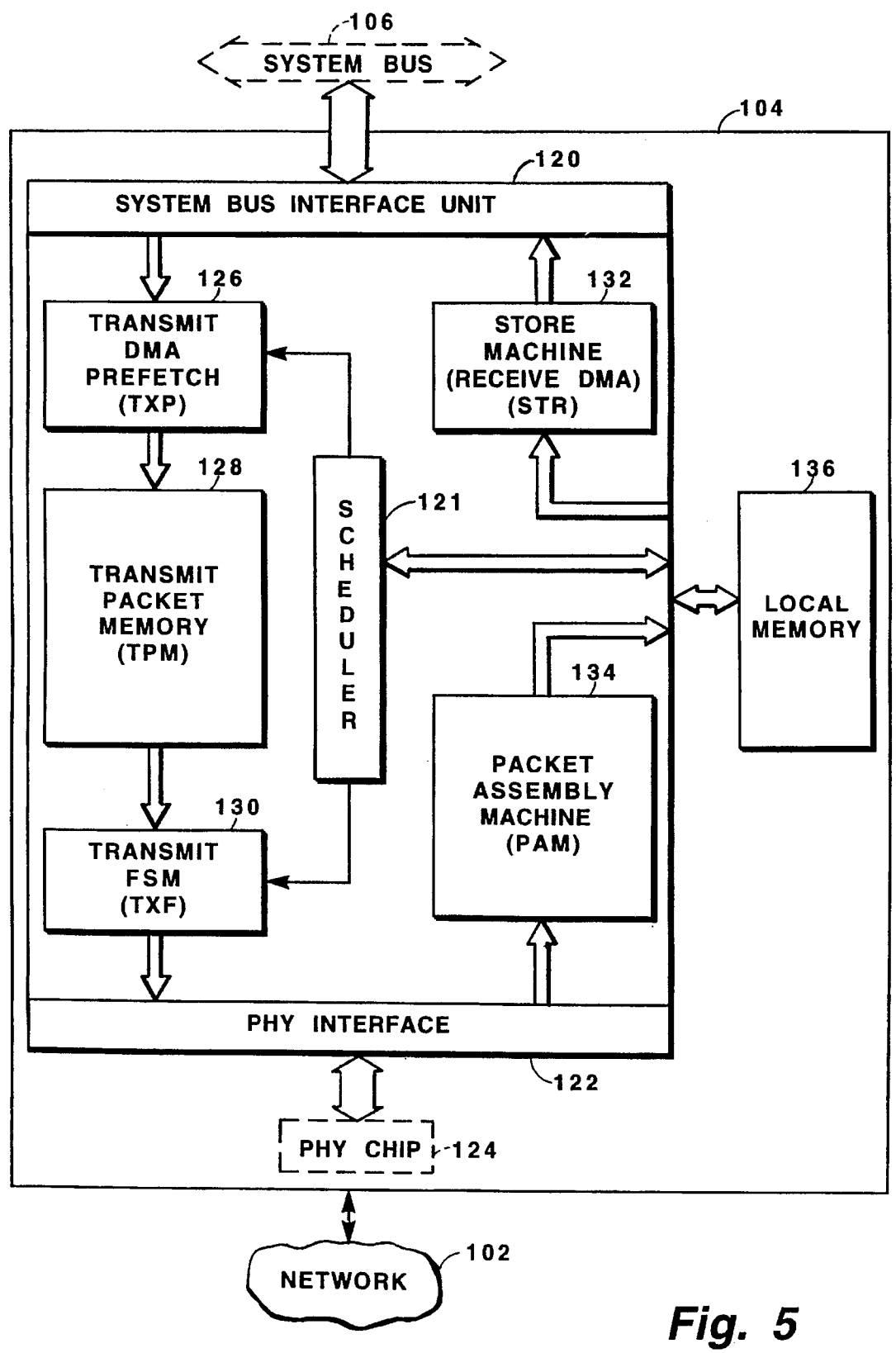
FIG. 5 is block diagram of an ATM adapter in accordance with the present invention.

Referring to FIG. 5, the ATM adapter 104 of FIG. 4 is shown to include a system bus interface unit 120 for communication with the system bus 106 (of FIG. 4) and a PHY interface 122 for communication with a PHY chip 124. In addition, the exemplary ATM adapter 104 is shown to contain a scheduler 121, a transmit DMA prefetch 126, a transmit packet memory 128, a transmit FSM (transmit state machine) 130, a store machine 132, a packet assembly machine 134, and a local memory 136. In FIG. 5, for convenience, thin lines represent control lines, while thick lines represent data flow lines.

The exemplary ATM adapter 104 operates in the following manner when receiving ATM cells. Incoming ATM cells are received by the PHY chip 124 via the PHY interface 122 and into the packet assembly machine 134. The packet assembly machine 134 assembles the ATM cells into a packet in the local memory 136 attached to it. Once the assembly of the packet from received ATM cells is complete, the packet assembly machine 134 signals packet assembly completion to the store machine 132. The store machine then reads the assembled packet from the local memory 136 and sends in to the host memory 110 (of FIG. 4) via the system bus 106 by way of the system bus interface unit 120.

The exemplary ATM adapter 104 operates in the following manner when transmitting packets. A packet is received from the system bus 106 via the system bus interface unit 120. A scheduler 121 decides which packet data will be DMA into the ATM adapter 104. The scheduler 121 also paces the transmissions on a set of different virtual circuits. The transmit DMA prefetch 126 reads chunks of the packet data from the system bus interface unit 120 and stores them in the transmit packet memory 128. The transmit FSM 130 contracts fifty-three byte ATM cells out of the data chunks in the transmit packet memory 128, thus accomplishing a segmentation process. The transmit FSM 130 then sends the fifty-three byte ATM cells through the PHY interface 122 to the PHY chip 124. The transmit FSM 130 will start its operation as soon as it detects enough bytes in the transmit packet memory 128 to construct at least one fifty-three byte ATM cell.

Having described a preferred embodiment of the invention, it will now become apparent to those skilled in the art that other embodiments incorporating its concepts may be provided. It is felt therefore, that this invention should not be limited to the disclosed invention, but should be limited only by the spirit and scope of the appended claims.

What is claimed is:

1. An Asynchronous Transfer Mode (ATM) adapter for receiving a plurality of ATM cells from a physical interface unit comprising:

a packet assembly machine connected to the physical interface unit, the packet assembly machine assembling the plurality of ATM cells into a first packet in only a dynamic random access local memory;

a store machine;

means, in the packet assembly machine, for signaling the store machine that the first packet is assembled;

means, in the store machine, for reading the first packet from the dynamic random access local memory and sending the first packet to a host memory via a system bus interface unit.

2. An Asynchronous Transfer Mode (ATM) network adapter comprising:

a receiver portion, the receiver portion capable of receiving a first plurality of ATM cells and assembling the first plurality of ATM cells into a first plurality of packets the receiver portion including:

a physical interface unit, the physical interface unit capable of receiving the first plurality of ATM cells;

a packet assembly machine connected to the physical interface unit, the packet assembly machine assembling the first plurality of ATM cells into a first packet only in a dynamic random access local memory;

a store machine;

means, in the packet assembly machine, for signaling the store machine that the first packet is assembled;

means, in the store machine, for reading the first packet from the dynamic random access local memory and sending the first packet to a host memory via a system bus interface unit; and a transmitter portion, the transmitted portion having a means for receiving a second plurality of packets and segmenting the second plurality of packets into a second plurality of ATM cells.

3. The Asynchronous Transfer Mode (ATM) network adapter according to claim 2 wherein the transmitter portion further comprises:

a system bus;

a system bus interface unit, the system bus receiving the second plurality of packets from the system bus;

a transmit DMA prefetch, the transmit DMA prefetch having means for reading the second plurality of packets;

a transmit packet memory connected to the transmit DMA fetch, the transmit packet memory having storing means to store a chunk of the second plurality of packets;

a transmit FSM connected to the transmit packet memory, the transmit FSM having means for segmenting the chunk of the second plurality of packets into the second plurality of 53-byte ATM long cells; and the transmit FSM having means for sending the second plurality of 53-byte long ATM cells to a PHY chip via a physical interface unit.

4. A method of receiving a plurality of ATM cells from a physical interface unit in an Asynchronous Transfer Mode (ATM) adapter comprising the steps of:

providing a packet assembly machine connected to said physical interface unit;

assembling said plurality of ATM cells into a first packet in only a dynamic random access local memory of the packet assembly machine;

storing said first packet in a store machine;

signaling the store machine that the first packet is assembled;

reading the first packet from the dynamic random access local memory; and sending the first packet to a host memory via a system bus interface unit.

* * * * *